(12) United States Patent
Ikebukuro

(10) Patent No.: US 8,967,517 B2
(45) Date of Patent: Mar. 3, 2015

(54) SPOOL BRAKE DEVICE FOR DUAL-BEARING REEL AND A DUAL-BEARING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 43 days.

(21) Appl. No.: 13/864,838

(22) Filed: Apr. 17, 2013

(65) Prior Publication Data

US 2013/0306777 A1  Nov. 21, 2013

(30) Foreign Application Priority Data

May 17, 2012 (JP) ................................. 2012-113160

(51) Int. Cl.
*A01K 89/01* (2006.01)
*A01K 89/0155* (2006.01)

(52) U.S. Cl.
CPC ............................... *A01K 89/01555* (2013.01)
USPC ......................................... 242/288; 242/286

(58) Field of Classification Search
CPC ..................... A01K 89/01555; A01K 89/0155
USPC ................................................ 242/288, 286
See application file for complete search history.

(56) References Cited

U.S. PATENT DOCUMENTS

| | | | | |
|---|---|---|---|---|
| 4,561,605 A | * | 12/1985 | Nakajima | 242/288 |
| 4,650,135 A | * | 3/1987 | Nakajima | 242/288 |
| 4,676,452 A | * | 6/1987 | Nakajima | 242/288 |
| 5,556,048 A | * | 9/1996 | Hashimoto | 242/288 |
| 5,692,693 A | * | 12/1997 | Yamaguchi | 242/288 |
| 5,749,534 A | * | 5/1998 | Morimoto | 242/288 |
| 6,126,105 A | * | 10/2000 | Yamaguchi | 242/288 |
| 6,412,722 B1 | * | 7/2002 | Kreuser et al. | 242/288 |
| 2002/0063181 A1 | * | 5/2002 | Yamaguchi | 242/286 |

FOREIGN PATENT DOCUMENTS

JP  04-068892 B  11/1992

* cited by examiner

*Primary Examiner* — Emmanuel M Marcelo
(74) *Attorney, Agent, or Firm* — Global IP Counselors

(57) ABSTRACT

A spool brake device for a dual-bearing reel is provided. The spool brake device is configured to apply a braking force to a spool. The brake device includes a conductor, a magnet, and a braking force adjusting unit. The magnet is configured to move along an axial direction of a spool shaft of the spool with respect to the reel unit and face the conductor in a radial direction relative to the axis of the spool shaft. The braking force adjusting unit is configured to adjust the braking force which is applied to the spool by a magnetic force acting on the conductor when the conductor is rotated, in such a way to change magnetic fluxes acting on the conductor by changing an axially facing range between the conductor and the magnet according to the movement of the magnet along the axial direction relative to the reel unit.

8 Claims, 10 Drawing Sheets

SPOOL BRAKE DEVICE FOR DUAL-BEARING REEL AND A DUAL-BEARING REEL

CROSS-REFERENCE TO RELATED APPLICATIONS

This application claims priority to Japanese Patent Application No. 2012-113160 filed on May 17, 2012. The entire disclosure of Japanese Patent Application No. 2012-113160 is hereby incorporated herein by reference.

BACKGROUND

1. Field of the Invention

The present invention relates to a spool brake device, particularly to a spool brake device for a dual-bearing reel configured to brake the rotation of a dual-bearing reel spool. Further, the present invention relates to a dual-bearing reel.

2. Background Art

Dual-bearing reels in use of lure fishing can cause backlash, i.e., a phenomenon that the spool rotational speed becomes faster than the fishing-line releasing speed in casting. When backlash is caused, so-called line sag (sag of a fishing line) occurs and results in tangling of the fishing line. In view of this, an electromagnetic brake has been provided as described in Japan Examined Patent Application Publication No. JP-B-H04-68892. The electromagnetic brake is configured to apply a braking force to a spool and is enabled to regulate the braking force.

The electromagnetic brake described in the Publication includes a cylindrical magnet support frame. A plurality of magnets is circumferentially disposed on the magnet support frame. The magnetic pole faces of the plural magnets are facing a spool and disposed away from the sidewall of the spool at a predetermined interval. The interval between the spool sidewall and the magnetic pole faces of the magnets is changed by moving the magnet support frame in the spool shaft direction. The braking force of the spool is thereby regulated.

The axial position of the magnet support frame is determined by cam grooves formed on the outer peripheral surface of the magnet support frame and guide protrusions respectively engaged with the cam grooves. Specifically, the magnet support frame is rotatable within a predetermined angular range and is configured to be rotated in accordance with the rotational speed of the spool. Through the engagement between the cam grooves and the guide protrusions, the rotation of the magnet support frame is converted into the axial moving of the magnet support frame. Further, the interval between the spool sidewall and the magnetic pole faces of the magnets supported by the magnet support frame is adjusted by axially moving the magnet support frame. In other words, the braking force of the spool is regulated.

SUMMARY

The spool brake device described in the Publication is configured to adjust a minute interval between facing elements, i.e., between the spool sidewall and the magnetic pole faces of the magnets. Therefore, a braking force can be regulated only within a small range. When the moving stroke of the magnet support frame is increased for expanding the regulation range, increase in size of the device is inevitable. Further, in the structure for regulating a braking force described in the Publication, the magnet support frame is easily moved in the axial direction in response to the high speed rotation of the spool. A spool braking force is thereby steeply increased. In such structure, chances are that a terminal tackle does not fly far in casting.

It is an advantage of the present invention to enable a spool brake device for a dual-bearing reel to regulate braking force with a wide range and appropriately apply to a spool a braking force varying with spool rotation.

A spool brake device for a dual-bearing reel is provided. The spool brake device is configured to apply a braking force to a spool which is rotatably mounted to a reel unit of the dual-bearing reel. The brake device includes a conductor, a magnet, and a braking force adjusting unit. The conductor is configured to be rotated in conjunction with the spool. The magnet is configured to move along an axial direction of a spool shaft of the spool with respect to the reel unit and face the conductor in a radial direction relative to the axis of the spool shaft. The braking force adjusting unit is configured to adjust the braking force which is applied to the spool by a magnetic force acting on the conductor when the conductor is rotated, in such a way to change magnetic fluxes acting on the conductor by changing an axially facing range between the conductor and the magnet according to the movement of the magnet along the axial direction relative to the reel unit.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
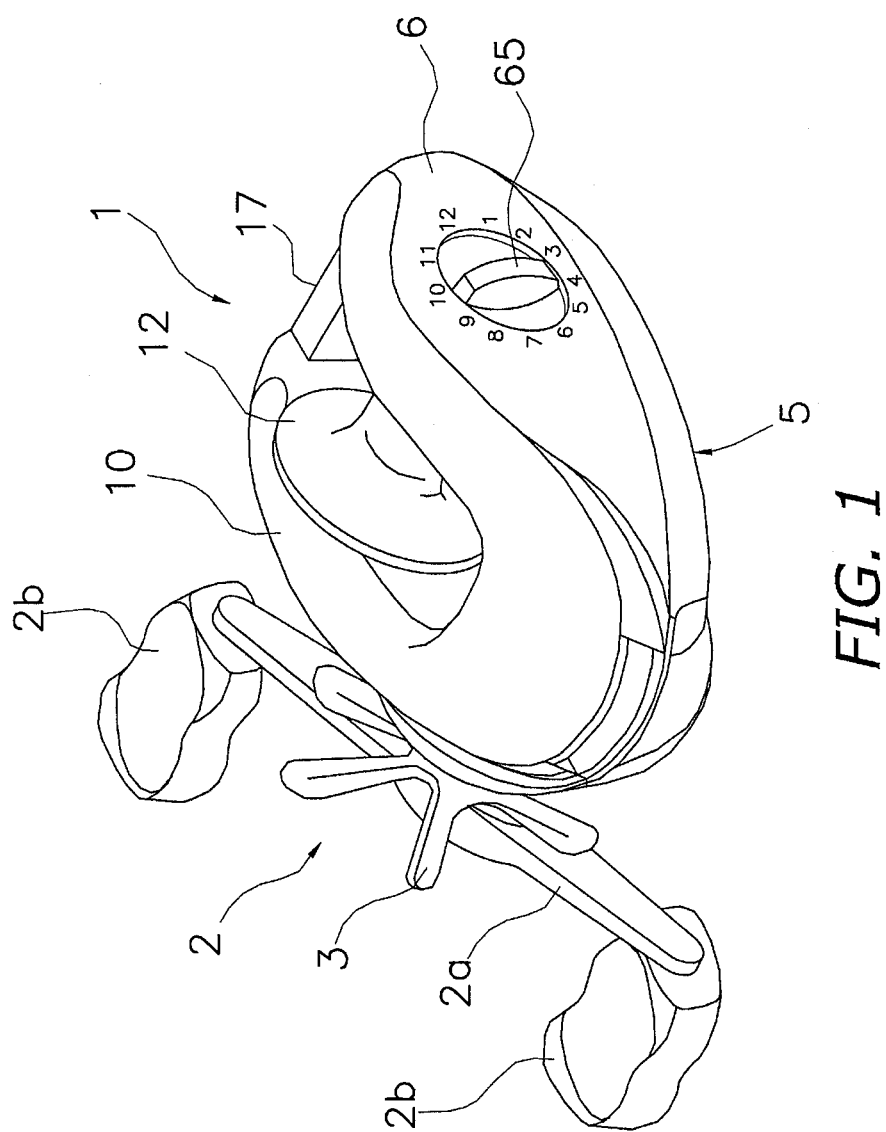
FIG. 1 is a perspective view of a dual-bearing reel employing an exemplary embodiment of the present invention.

FIG. 1 illustrates a dual-bearing reel employing an exemplary embodiment of the present invention. The dual-bearing reel is a bait reel mainly used for lure fishing. The dual-bearing reel includes a reel unit 1, a handle 2 for spool rotation, and a star drag 3 for drag regulation. The handle 2 is disposed laterally to the reel unit 1. The star drag 3 is disposed on the reel unit 1 side of the handle 2. The handle 2 is of a double handle type. The handle 2 includes a plate-shaped arm 2a and a pair of knobs 2b rotatably attached to the both ends of the arm 2a. The arm 2a of the handle 2 has an outer surface formed by a smooth seamless surface, and is thus shaped whereby a fishing line less easily gets stuck therewith.

Figure 2:
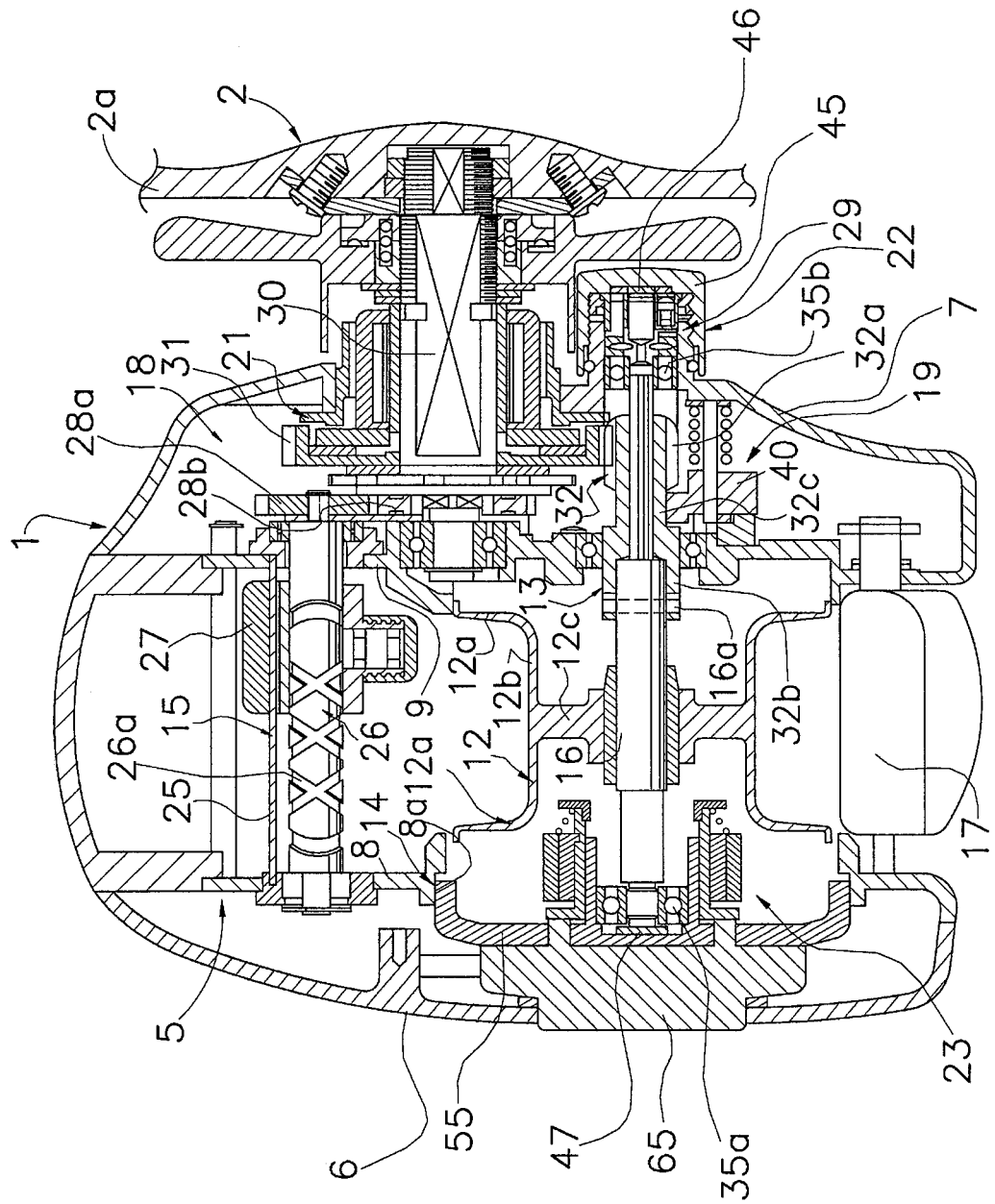
FIG. 2 is a cross-sectional view of the internal structure of a reel unit of the dual-bearing reel.

As illustrated in FIG. 2, the reel unit 1 includes a frame 5, a first side cover 6, a second side cover 7, and a thumb rest 10. The first side cover 6 and the second side cover 7 are attached to the both lateral sides of the frame 5. The thumb rest 10 is attached to the top of the frame 5. The frame 5 includes a pair of a first side plate 8 and a second side plate 9 and a plurality of coupling portions (not illustrated in the figure). The first side plate 8 and the second side plate 9 are disposed while facing each other at a predetermined interval. The coupling portions couple the first side plate 8 and the second side plate 9.

The second side cover 7, which is disposed on the handle 2 side, is detachably fixed to the second side plate 9 by one or more screws. The first side plate 8, which is disposed oppositely to the handle 2, has an opening 8a allowing a spool 12 to pass therethrough. A brake case 55 is fixed to the first side cover 6 disposed oppositely to the handle 2 by one or more screws.

As illustrated in FIG. 2, the frame 5 accommodates the spool 12, a level winding mechanism 15, and a clutch operating lever 17. The level winding mechanism 15 is a mechanism for uniformly winding the fishing line onto the spool 12. The clutch operating lever 17 functions as a thumb pad in thumbing the fishing line.

Further, a gear mechanism 18, a clutch mechanism 13, a clutch engaging/disengaging mechanism 19, a drag mechanism 21, and a casting control mechanism 22 are disposed between the frame 5 and the second side cover 7. The gear mechanism 18 is configured to transmit a rotational force from the handle 2 to the spool 12 and the level winding mechanism 15. The clutch engaging/disengaging mechanism 19 is configured to engage/disengage the clutch mechanism 13 in conjunction with the operation of the clutch operating lever 17. The drag mechanism 21 is configured to brake the spool 12 in releasing the fishing line. The casting control mechanism 22 is configured to brake the spool shaft 16 while abutting to the both ends of the spool shaft 16 from the axial outside of the spool shaft 16. Further, a spool brake mechanism 23 is disposed in the opening 8a for inhibiting occurrence of backlash in casting.

The spool 12 has saucer-shaped flanges 12a on the both lateral parts thereof. Further, the spool 12 has a tubular bobbin trunk 12b between the both flanges 12a. Yet further, the spool 12 has a tubular boss 12c integrally formed with the bobbin trunk 12b. The tubular boss 12c is formed on the inner peripheral side of the bobbin trunk 12b. The spool 12 is fixed onto the spool haft 16 penetrating the boss 12c by, for instance, serration coupling. The spool 12 is a non-magnetic electric conductor made of for instance, aluminum alloy. The spool 12 in itself herein corresponds to a conductor 50 to be described.

The spool shaft 16 is extending outwards of the second side cover 7 while penetrating the second side plate 9. One end of the spool shaft 16 is rotatably supported by a boss 29 formed on the second side cover 7 through a bearing 35b. On the other hand, the other end of the spool shaft 16 is rotatably supported within an inner tubular portion 55a of the brake case 55 through a bearing 35a.

The level winding mechanism 15 includes a guide tube 25, a warm shaft 26, and a line guide 27. The guide tube 25 is fixed between the paired first and second side plates 8 and 9. The warm shaft 26 is rotatably disposed within the guide tube 25. A gear 28a, which forms a part of the gear mechanism 18, is fixed to an end of the warm shaft 26. Further, the warm shaft 26 has a helical groove 26a formed thereon. The line guide 27 is meshed with the helical groove 26a. Therefore, the line guide 27 is configured to be reciprocated by the guide tube 25 when the warm shaft 26 is rotated through the gear mechanism 18. The fishing line is inserted into and through the line guide 27, and is uniformly wound about the spool 12.

The gear mechanism 18 includes a drive gear 31, a pinion gear 32, the gear 28a, and a gear 28b. The drive gear 31 is fixed onto a handle shaft 30. The pinion gear 32, which has a tubular shape, is meshed with the drive gear 31. The gear 28a is fixed onto the aforementioned end of the warm shaft 26. The gear 28b is meshed with the gear 28a while being non-rotatably fixed onto the handle shaft 30.

The pinion gear 32 is disposed while penetrating the second side plate 9. The pinion gear 32 is a tubular member. The spool shaft 16 is inserted through the center part of the pinion gear 32. The pinion gear 32 is mounted onto the spool shaft 16 while being axially movable. The pinion gear 32 has a teeth portion 32a and a meshing portion 32b. The teeth portion 32a is formed on the outer periphery of one end (i.e., the right end in FIG. 2) of the pinion gear 32. The teeth portion 32a is meshed with the drive gear 31. The meshing portion 32b is formed on the other end of pinion gear 32. Further, the pinion gear 32 has a narrowed portion 32c between the teeth portion 32a and the meshing portion 32b.

The meshing portion 32b is formed by a concave groove formed on the end surface of the pinion gear 32. A clutch pin 16a, which is radially penetrating the spool shaft 16, is engaged with the concave groove. When the pinion gear 32 is herein moved outwards, the clutch pin 16a of the spool shaft 16 is separated away from and thus disengaged from the concave groove of the meshing portion 32b. Accordingly, rotation from the handle shaft 30 is prevented from being transmitted to the spool 12. The clutch pin 16a and the concave groove of the meshing portion 32b form the clutch mechanism 13.

The clutch operating lever 17 is disposed behind the spool 12 while being disposed on the rear part of the space interposed between the paired first and second side plates 8 and 9. Each of the first and second side plates 8 and 9 of the frame 5 has an elongated hole (not illustrated in the figures). A clutch cam (not illustrated in the figures) penetrates the elongated holes for fixing the clutch operating lever 17. The clutch operating lever 17 is slid up and down along the elongated holes. The clutch engaging/disengaging mechanism 19 includes a clutch yoke 40. The clutch engaging/disengaging mechanism 19 is configured to move the clutch yoke 40 in parallel to the axis of the spool shaft in conjunction with pivot of the clutch operating lever 17. Further, the clutch engaging/disengaging mechanism 19 is configured to move the clutch yoke 40 for automatically turning on the clutch mechanism 13 in conjunction with the rotation of the handle shaft 30 in the fishing-line winding direction.

In such structure, the pinion gear 32 is normally located in an inward clutch engaged position. Under the clutch engaged position, the clutch pin 16a of the spool shaft 16 is engaged with the meshing portion 32b of the pinion gear 32, and a clutch-on state is thereby established. On the other hand, when the pinion gear 32 is moved outwards by the clutch yoke 40, the clutch pin 16a is disengaged from the meshing portion 32b, and a clutch-off state is thereby established.

The casting control mechanism 22 includes a cap 45, a friction plate 46, and a friction plate 47. The cap 45 is a closed-end tubular member screwed onto a male threaded portion formed on the outer periphery of the boss 29. The friction plate 46 is attached to the bottom part of the cap 45. The friction plate 47 is attached to the brake case 55. The friction plates 46 and 47 interpose and hold the spool shaft 16 therebetween while making contact with the both ends of the spool shaft 16. For example, abutting pressure, which is applied to the spool shaft 16 by the friction plates 46 and 47, is regulated when the cap 45 is rotated. Accordingly, the braking force of the spool 12 is regulated.

Figure 3:
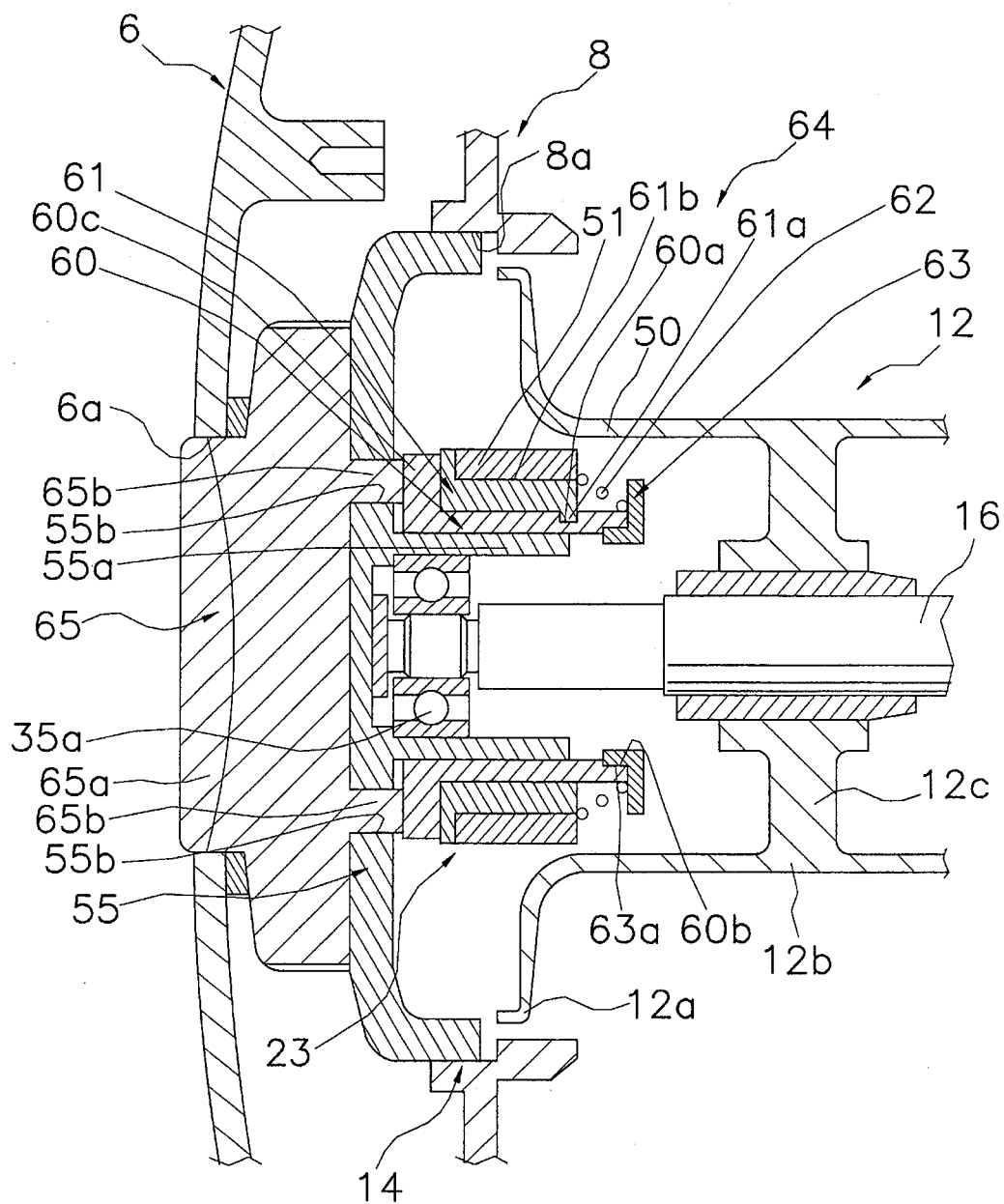
FIG. 3 is an enlarged cross-sectional view of a spool brake device of the dual-bearing reel.

To brake the spool 12, the spool brake mechanism 23 is configured to apply a force to the spool 12 in a direction opposite to the rotational direction of the spool 12. When explained in detail, as illustrated in FIG. 3, in the spool brake mechanism 23, magnets 51 mounted to the brake case 55 are moved to the inner peripheral side of the spool 12 as the conductor 50. Accordingly, the conductor 50 is disposed within the magnetic field of the magnets 51. When the spool 12 as the conductor 50 is rotated under the condition, eddy current is generated in accordance with the rotational frequency of the spool 12. Due to the eddy current herein generated, a force is applied to the spool 12 (i.e., the conductor 50) in the direction opposite to the rotational direction. The spool 12 is thereby braked in proportion to the rotational speed thereof.

Figure 4:
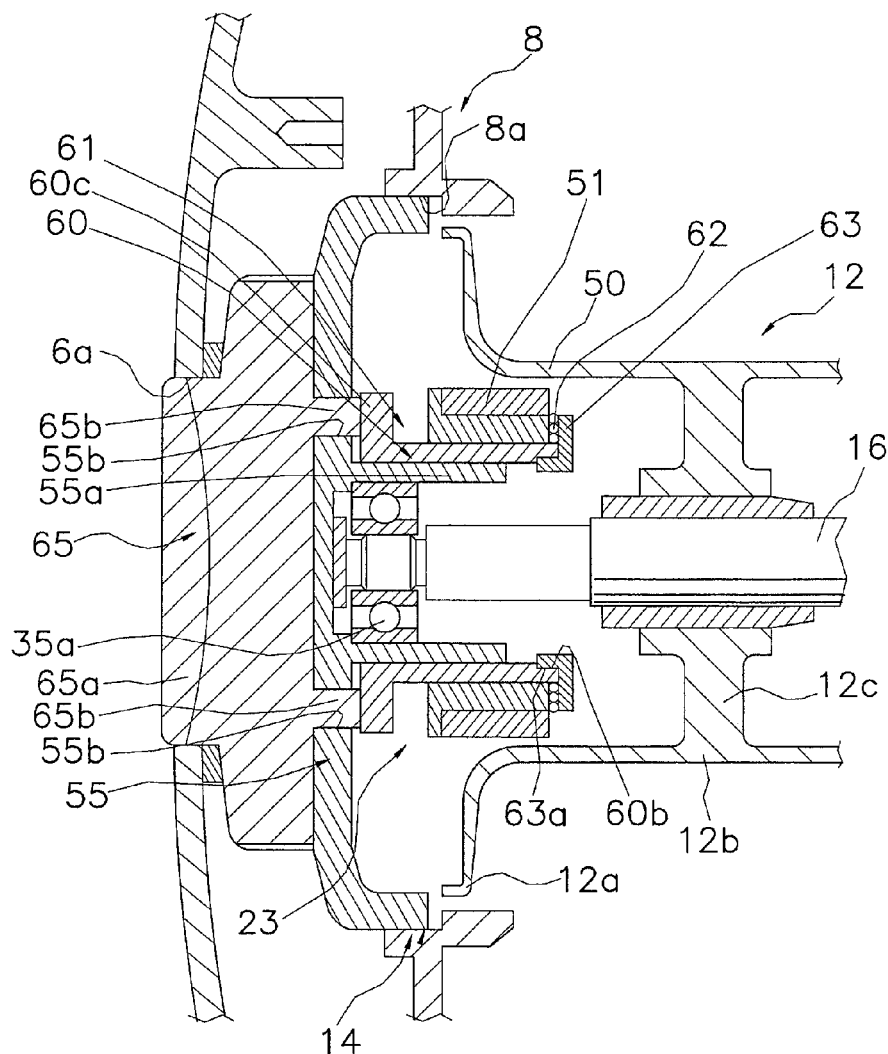
FIG. 4 is an enlarged cross-sectional view of the spool brake device when a second tube is axially moved.
Figure 5:
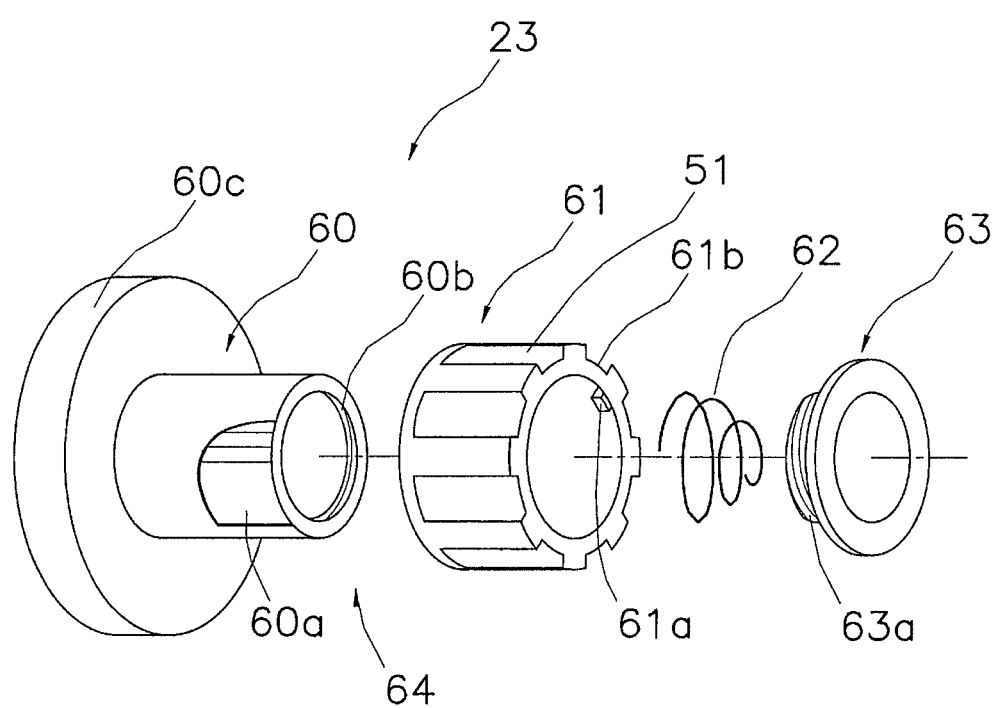
FIG. 5 is an enlarged exploded perspective view of main components of the spool brake device.

As illustrated in FIGS. 3 to 5, the spool brake mechanism 23 includes the conductor 50, the magnets 51, a first tube 60 having a tubular shape, a second tube 61 having a tubular shape, a spring member 62, a retainer member 63, and a braking force adjusting unit 64.

The conductor 50 is rotated in conjunction with the spool 12. As illustrated in FIGS. 3 and 4, the magnets 51 are disposed while being allowed to face the conductor 50. The conductor 50 corresponds to the spool 12 made of aluminum alloy. The conductor 50 is a non-magnetic electric conductor. When described in detail, the conductor 50 is the inner periphery of the first side plate 8 side part (i.e., the left side part in FIG. 3) of the tubular bobbin trunk 12b of the spool 12.

As illustrated in FIGS. 3 to 5, the first tube 60 is mounted to the outer periphery of the inner tubular portion 55a of the brake case 55. When described in detail, the inner periphery of the first tube 60 is mounted to the outer periphery of the inner tubular portion 55a of the brake case 55.

Figure 6:
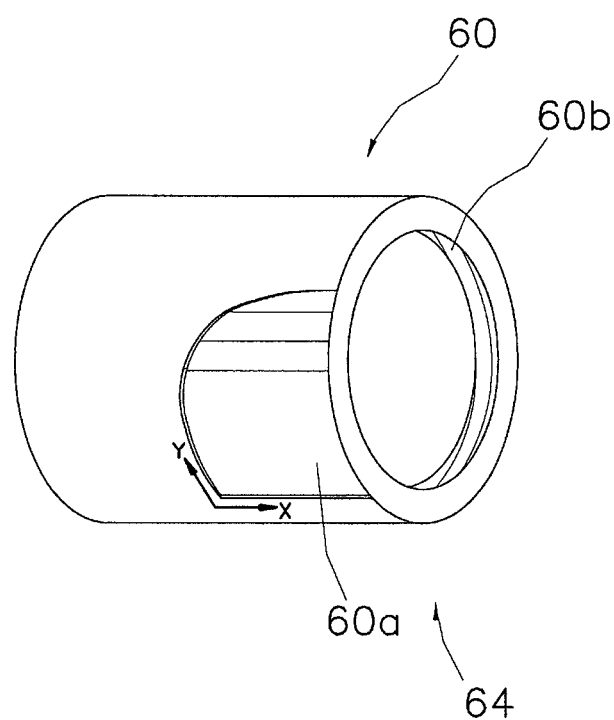
FIG. 6 is an enlarged perspective view of a first tube.

The first tube 60 has an engaged portion 60a. The engaged portion 60a is formed in a curved shape steeply varying in the axial direction in accordance with variation in the circumferential direction. For example, the engaged portion 60a is a groove formed in the aforementioned curved shape. The engaged portion 60a (e.g., the groove) is formed along a quadratic curve. The quadratic curve is defined by a first reference axis X and a second reference axis Y (see FIG. 6). The first reference axis X is axially extending on the outer peripheral surface of the first tube 60, whereas the second reference axis Y is circumferentially extending on the outer peripheral surface of the first tube 60.

The first tube 60 has a female threaded portion 60b on the inner periphery of the spool 12 side tip (i.e., the right side tip in FIG. 3) thereof. On the other hand, the retainer member 63 has a male threaded portion 63a on the outer periphery of the brake case 55 side tip (i.e., the left side tip in FIG. 3) thereof. The male threaded portion 63a is screwed into the female threaded portion 60b. Accordingly, the retainer member 63 is attached to the first tube 60. The first tube 60 has a large diameter flange 60c on the brake case 55 side end (i.e., the left side end in FIG. 3) thereof. Pressure portions 65b of an operating knob 65 to be described make contact with the flange 60c.

The magnets 51 apply a magnetic force to the conductor 50 for braking the rotation of the spool 12. As illustrated in FIGS. 3 to 5, the magnets 51 are fixed to the outer periphery of the second tube 61. For example, the magnets 51 are formed by eight columnar permanent magnets. As illustrated in FIG. 5, the magnets 51 are disposed in eight positions on the outer periphery of the second tube 61 while being circumferentially aligned at equal intervals.

In conjunction with the axial moving of the second tube 61, the magnets 51 are movable between a non-facing position (i.e., a position illustrated in FIG. 3) and a facing position (i.e., a position illustrated in FIG. 4). In the non-facing position, the magnets 51 are not facing the inner periphery of the bobbin trunk 12b of the spool 12 (i.e., the conductor 50). In the facing position, the magnets 51 are facing the inner periphery of the bobbin trunk 12b of the spool 12. When described in detail, in the facing position illustrated in FIG. 4, roughly one-third of the axial length the magnets 51 is facing the inner periphery of the bobbin trunk 12b of the spool 12. The range of roughly one-third of the axial length of the magnets 51 is defined as a facing range (i.e., a facing area) between the magnets 51 and the bobbin trunk 12b of the spool 12. Therefore, in the facing position illustrated in FIG. 4, the number of magnetic fluxes acting on the spool 12 (i.e., the conductor 50) is increased and the braking force for braking the rotation of the spool 12 is increased, compared to the non-facing position illustrated in FIG. 3.

As illustrated in FIGS. 3 to 5, the second tube 61 is mounted to the outer periphery of the first tube 60 while being relatively rotatable therewith and axially movable with respect thereto. The second tube 61 has holding portions 61b for holding the magnets 51. The holding portions 61b are formed in eight positions on the outer periphery of the second tube 61. The magnets 51 are attached and fixed to the holding portions 61b on a one-to-one basis. For example, the respective holding portions 61b are formed for disposing the outer peripheral surface of the second tube 61 and the outer peripheral surfaces of the respective magnets 51 on the same plane. More specifically, each holding portion 61b is formed in a concave shape for forming the outer peripheral surface of the second tube 61 in a smooth circumferential surface when the magnets 51 are mounted to the second tube 61.

As illustrated in FIGS. 3 and 5, the second tube 61 has an engaging portion 61a. The engaging portion 61a is a portion to be engaged with the engaged portion 60a. The engaging portion 61a is engaged with and guided by the engaged portion 60a while the second tube 61 is relatively rotatable with and axially movable with respect to the first tube 60. The engaging portion 61a is disposed on the inner periphery of the second tube 61. For example, the engaging portion 61a is a protrusion inwardly protruding from the spool 12 side portion (i.e., the right side portion in FIG. 3) of the inner periphery of the second tube 61. The engaging portion 61a (i.e., a protrusion) of the second tube 61 is configured to be moved in conjunction with the rotation of the second tube 61 while being engaged with the engaged portion 60a formed in the shape of a quadratic curve on the first tube 60. Accordingly, the second tube 61 and the magnets 51 are axially moved.

The spring member 62 is a member for urging the second tube 61. When described in detail, as illustrated in FIGS. 3 to 5, the spring member 62 urges the second tube 61 towards the brake case 55 (i.e., leftwards in FIG. 3). The spring member 62 is disposed while making contact with the spool 12 side tip (i.e., the right side tip in FIG. 3) of the second tube 61. Further, the spring member 62 is disposed between the retainer member 63 and the second tube 61. Specifically, the spring member 62 is a cone coil spring. To prevent attraction by the magnets 51, the spring member 62 is made of, for instance, a non-magnetic material such as SUS303.

The retainer member 63 is a member for retaining the spring member 62. As illustrated in FIGS. 3 to 5, the retainer member 63 is attached to the spool 12 side tip (i.e., the right side tip in FIG. 3) of the first tube 60. The retainer member 63 is herein attached to the first tube 60 by screwing the male threaded portion 63a, which is formed on the outer periphery of the brake case 55 side tip (i.e., the left side tip in FIG. 3) of the retainer member 63, into the female threaded portion 60b of the first tube 60.

The braking force adjusting unit 64 is configured to regulate the braking force of the spool 12 in accordance with the rotation of the spool 12. When described in detail, the braking force adjusting unit 64 is configured to regulate the braking force of the spool 12 in accordance with the rotational frequency (i.e., the rotational speed) of the spool 12 when the spool 12 is rotated while the magnets 51 and the spool 12 (i.e., the conductor 50) are radially facing each other. Specifically, in the braking force adjusting unit 64, the second tube 61 is configured to be axially moved in rotation with respect to the first tube 60 by the magnetic force of the magnets 51 acting on the conductor 50 when the spool 12 radially facing the magnets 51 is rotated. Accordingly, the area of the part that the conductor 50 and the magnets 51 are radially facing (i.e., the facing range) varies and the braking force of the spool 12 also varies.

More specifically, when the magnetic force of the magnets 51 acts on the conductor 50 and the braking force is generated in the spool 12, a reactive force acts on the second tube 61 in accordance with the braking force. The second tube 61 is rotated with respect to the first tube 60 by the reactive force. The engaging portion 61a is moved along the engaged portion 60a in conjunction with the rotation of the second tube 61. Accordingly, the second tube 61 and the magnets 51 are axially moved.

For example, when the rotational frequency (i.e., the rotational speed) of the spool 12 is increased, the second tube 61 and the magnets 51 are moved towards the spool 12 (i.e., rightwards in FIG. 4). Accordingly, the number of magnetic fluxes acting the spool 12 as the conductor 50 is increased. The braking force of the spool 12 is thereby increased. On the other hand, when the rotational frequency (i.e., the rotational speed) of the spool 12 is reduced, the second tube 61 and the magnets 51 are moved by the spring member 62 in a direction away from the spool 12 (i.e., leftwards in FIG. 4). Accordingly, the number of magnetic fluxes acting on the spool 12 as the conductor 50 is reduced. The braking force of the spool 12 is also thereby reduced.

Thus, the braking force adjusting unit 64 is allowed to automatically regulate the braking force of the spool 12 in accordance with the rotation of the spool 12. For example, in the braking force adjusting unit 64, the braking force as represented in the curve A of FIG. 7 acts on the spool 12 in accordance with the rotational frequency. As described above, when the engaged portion 60a is formed in the shape of a quadratic curve, the braking force with respect to the rotational frequency (i.e., the curve A in FIG. 7) is approximated by a quadratic curve. In other words, the braking force adjusting unit 64 can obtain a braking force approximate to a centrifugal braking force proportional to the square of the rotational speed of the spool 12. Because of this, it is desirable to form the engaged portion 60a in the shape of a quadratic curve in order to apply a well-balanced braking force to the spool 12.

Figure 7:
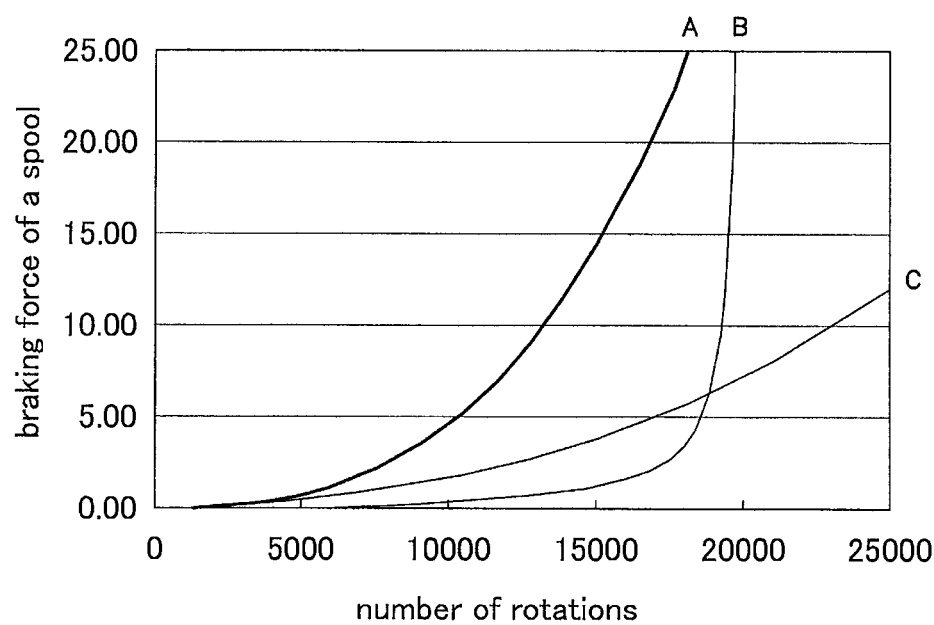
FIG. 7 is a chart representing types of relation between a spool rotational speed and a spool braking force regarding respective shapes of an engaged portion of the first tube (note that a curve A represents the present invention; a curve B represents a second exemplary embodiment; a curve C represents a third exemplary embodiment)

Alternatively, when the engaged portion 60a of the first tube 60 is formed in a shape defined by a linear equation (i.e., a linear shape), the relation between the rotational frequency and the braking force is established as represented in the curve B of FIG. 7. In the curve B, the braking force steeply varies with respect to variation in the rotational frequency. Therefore, when the engaged portion 60a is formed in a linear shape, regulation is difficult for a novice angler. However, as long as appropriate regulation is possible, the braking force can be weakened in the initial stage and the latter half stage of rotation. Accordingly, it is possible to prolong the flying distance of a lure as a terminal tackle.

Yet alternatively, when the engaged portion 60a is formed in a shape defined by a cubic curve, the relation between the rotational frequency and the braking force is established as represented in the curve C of FIG. 7. In the curve C, the braking force gently varies with respect to variation in the rotational frequency. Therefore, a relatively large braking force acts on the spool 12 even at a low speed rotation. Accordingly, it is not easy to prolong the flying distance of the lure. However, a novice-friendly characteristic can be obtained as a braking device.

As illustrated in FIG. 3, the brake case 55 is a closed-end tubular case member. The outer periphery of the brake case 55 is attached to the opening 8a of the first side plate 8 by a bayonet structure 14. The brake case 55 has the inner tubular portion 55a protruding in a tubular shape on the spool 12 side center part (i.e., the right side center part in FIG. 4). The first tube 60 is attached onto the outer periphery of the inner tubular portion 55a. The inner periphery of the inner tubular portion 55a supports an outer race of the bearing 35a. The brake case 55 has a plurality of through holes 55b formed on the outer peripheral side of the base end of the inner tubular portion 55a. The pressure portions 65b (to be described) of the operating knob 65 are inserted through the through holes 55b.

As illustrated in FIGS. 3 and 4, the operating knob 65 has a circular knob portion 65a and the plural pressure portions 65b. The knob portion 65a is a portion exposed through an opening 6a formed in the first side cover 6. The plural pressure portions 65b are disposed while being protruding from the knob portion 65a towards the spool 12 (i.e., rightwards in FIG. 4). The pressure portions 65b are inserted through the through holes 55b, and make contact with the flange 60c of the first tube 60 while being allowed to press the first tube 60.

The knob portion 65a is rotatably supported by the opening 6a. The operating knob 65 has a cam mechanism (not illustrated in the figures) configured to convert the rotation of the knob portion 65a into the axial moving of the pressure portions 65b. When the operating knob 65 is herein turned in the clockwise direction, the second tube 61 and the magnets 51 are moved in a direction closer to the spool 12 as the conductor 50 (i.e., rightwards in FIG. 3) through the first tube 60 by cam action. In other words, the magnets 51 get closer to the conductor 50. As a result, the number of magnetic fluxes passing through the conductor 50 is increased, and thereby, the braking force with respect to the spool 12 is strengthened.

In contrast, when the operating knob 65 is turned in the counterclockwise direction, the second tube 61 and the magnets 51 are moved in the direction away from the spool 12 as the conductor 50 (i.e., leftwards in FIG. 3) through the first tube 60 by cam action. In other words, the magnets 51 are separated away from the conductor 50. As a result, the number of magnetic fluxes passing through the conductor 50 is reduced, and thereby, the entire braking force is weakened.

Thus, the initial braking force is set for the spool 12 by turning the operating knob 65.

Next, a reel action will be explained in detail. Normally, the clutch yoke 40 is pressed inwards and a clutch-on state is established. As a result, the rotational force from the handle 2 is transmitted to the spool 12 through the handle shaft 30, the drive gear 31, the pinion gear 32, and the spool shaft 16. In other words, when the handle 2 is rotated, the spool 12 is rotated in the fishing-line winding direction.

In casting, the operating knob 65 is rotated whereby the initial braking force is regulated in order to inhibit occurrence of backlash. When it is demanded to inhibit the entire braking force, the operating knob 65 is required to be turned in the counterclockwise direction for separating the magnets 51 away from the conductor 50. When the operating knob 65 is actually turned in the counterclockwise direction, the magnets 51 are moved in the direction away from the conductor 50 by cam action. Accordingly, the number of magnetic fluxes passing through the conductor 50 (i.e., the spool 12) is reduced, and thereby, the entire braking force is weakened.

In contrast, when it is demanded to enlarge the entire braking force, the operating knob 65 is required to be turned in the clockwise direction for making the magnets 51 get closer to the conductor 50. When the operating knob 65 is actually turned in the clockwise direction, the magnets 51 are moved in the direction closer to the conductor 50 by cam action. Accordingly, the number of magnetic fluxes passing through the conductor 50 is increased, and thereby, the entire braking force is strengthened.

Subsequently, the clutch operating lever 17 is pressed downwards. In conjunction with the moving of the clutch operating lever 17, the clutch yoke 40 is moved outwards and the pinion gear 32 is moved in the same direction as the clutch yoke 40. As a result, a clutch-off state is established. In the clutch-off state, the rotation from the handle shaft 30 is not transmitted to the spool 12 and the spool shaft 16, and therefore the spool 12 is allowed to be freely rotated. Then, a fishing rod is cast in the clutch-off state, while thumbing is executed for the spool with the thumb put on the clutch operating lever 17 and simultaneously the reel is axially tilted so that the spool shaft 16 is arranged along the vertical plane. Accordingly, a lure is thrown, while the spool 12 is rotated with high momentum in the fishing-line releasing direction.

A braking force is configured to act on the spool 12 as the conductor 50 when the spool 12 is rotated as described above while the magnets 51 are set in the facing position (i.e., the position in FIG. 4). While the spool 12 is thus braked, a reactive force acts on the second tube 61 in accordance with the braking force. The second tube 61 is rotated by the reactive force, and the engaging portion 61a is moved along the engaged portion 60a. Accordingly, the second tube 61 and the magnets 51 are axially moved towards the spool 12 (i.e., rightwards in FIG. 4).

For example, when the rotational frequency (i.e., the rotational speed) of the spool 12 is increased, the reactive force varying with the braking force is also increased and the second tube 61 is pulled into the inner periphery of the conductor 50. Accordingly, the number of magnetic fluxes acting on the conductor 50 (i.e., the spool 12) is increased and the braking force is strengthened. In contrast, when the rotational frequency (i.e., the rotational speed) of the spool 12 is reduced, the reactive force varying with the braking force is also reduced. In this case, the second tube 61 is moved in the direction away from the spool 12 by the spring member 62. Accordingly, the number of magnetic fluxes acting on the conductor 50 (i.e., the spool 12) is reduced and the braking force is weakened. Thus, the braking force of the spool 12 is automatically regulated in accordance with the rotation of the spool 12.

As described above, in the dual-bearing reel including the spool brake mechanism 23, the second tube 61 is rotated by the reactive force varying with the braking force of the spool 12. Accordingly, the engaging portion 61a as the protrusion of the second tube 61 is moved along the engaged portion 60a as the groove (i.e., the groove formed in the quadratic curve shape) of the first tube 60. The second tube 61 and the magnets 51 are thereby axially moved, and the number of magnetic fluxes acting on the spool 12 as the conductor 50 varies. Thus, the braking force of the spool 12 is automatically regulated in accordance with the rotation of the spool 12.

In the spool brake mechanism 23 configured to be operated as described above, the braking force of the spool 12 is regulated by changing the area of the magnets 51 facing the conductor 50 in accordance with the rotation of the spool 12 (i.e., the conductor 50). Therefore, compared to the well-known art, the spool brake mechanism 23 can smoothly regulate the braking force of the spool 12 with a wide range. Therefore, the braking force varying with rotation of the spool 12 can be appropriately applied to the spool 12.

Further, in the spool brake mechanism 23, the engaged portion 60a of the first tube 60 is formed in a curved shape steeply varying in the axial direction with respect to variation of the first tube 60 in the circumferential direction. Therefore, it is possible to inhibit the second tube 61 and the magnets 51 from performing an action of steeply moving in the axial direction in accordance with the high-speed rotation of the spool 12. In other words, it is possible to prevent steep increase in the braking force acting on the spool 12.

Yet further, when the aforementioned curve is formed in a quadratic curve, it is possible to obtain the braking force approximate to the centrifugal braking force proportional to the square of the rotational speed. In other words, the braking force varying with spool rotation can be appropriately applied to the spool.

Figure 8:
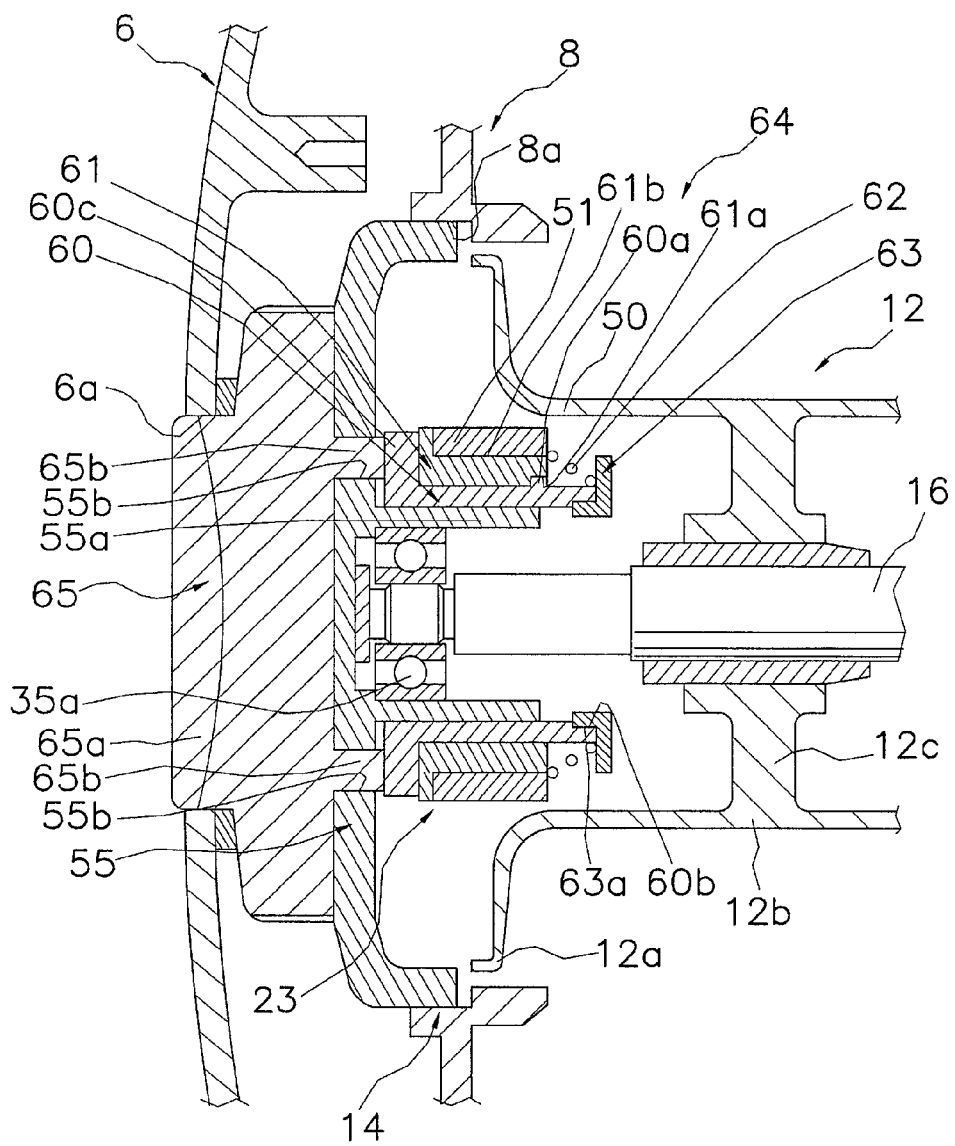
FIG. 8 is a diagram corresponding to FIG. 3 according to another exemplary embodiment.

Other Exemplary Embodiments (a) The aforementioned exemplary embodiment has exemplified the case that the engaged portion 60a is the groove formed in a concave shape on the outer periphery of the first tube 60 whereas the engaging portion 61a is the protrusion formed on and protruding from the inner periphery of the second tube 61. Alternatively to the above, as illustrated in FIG. 8, the engaged portion 60a can be formed as a protrusion protruding from the outer periphery of the first tube 60, whereas the engaging portion 61a can be formed as a groove formed in a concave shape on the inner periphery of the second tube 61. In this case, the protrusion as the engaged portion 60a is formed in a curved shape steeply varying in the axial direction with respect to variation in the first tube 60 in the circumferential direction. Even with the structure, it is possible to achieve advantageous effects similar to those achieved by the aforementioned exemplary embodiment.

Figure 9:
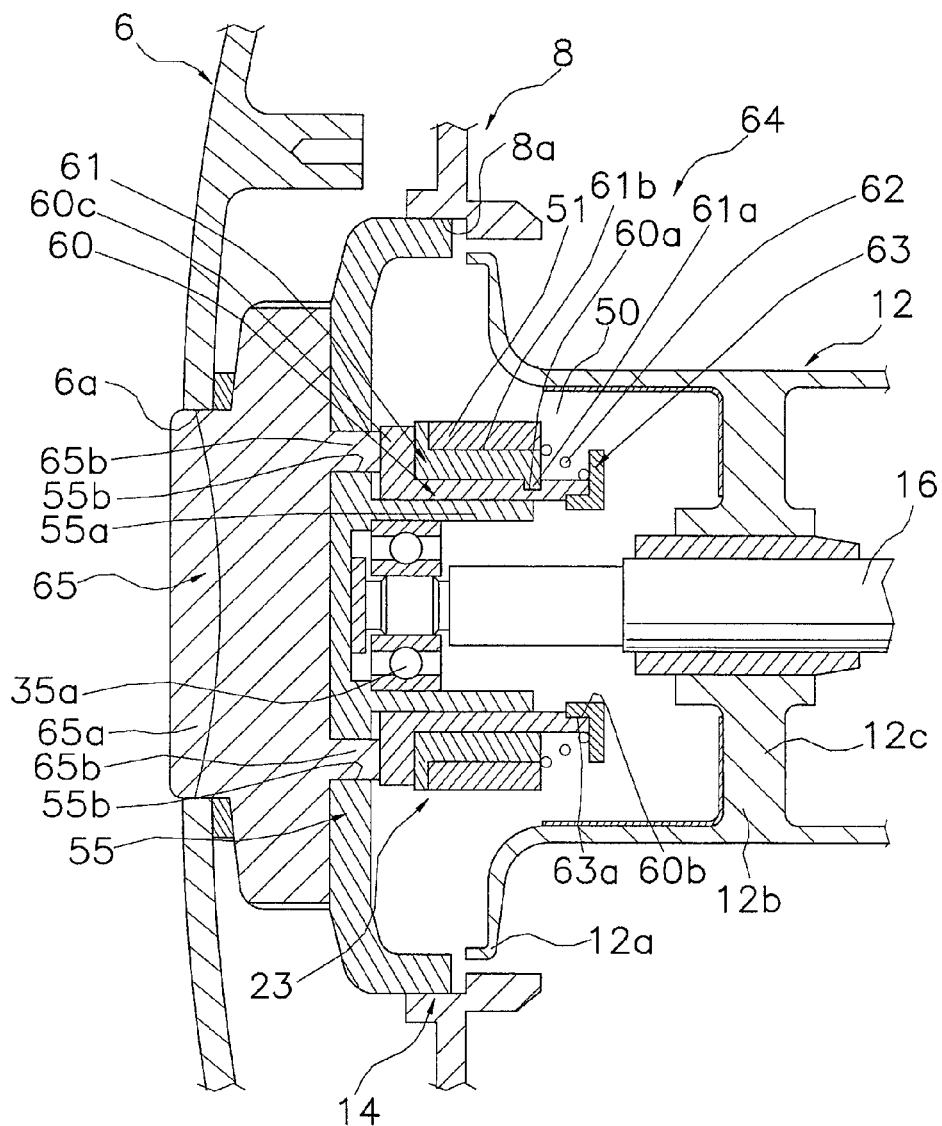
FIG. 9 is a diagram corresponding to FIG. 3 according to yet another exemplary embodiment.
Figure 10:
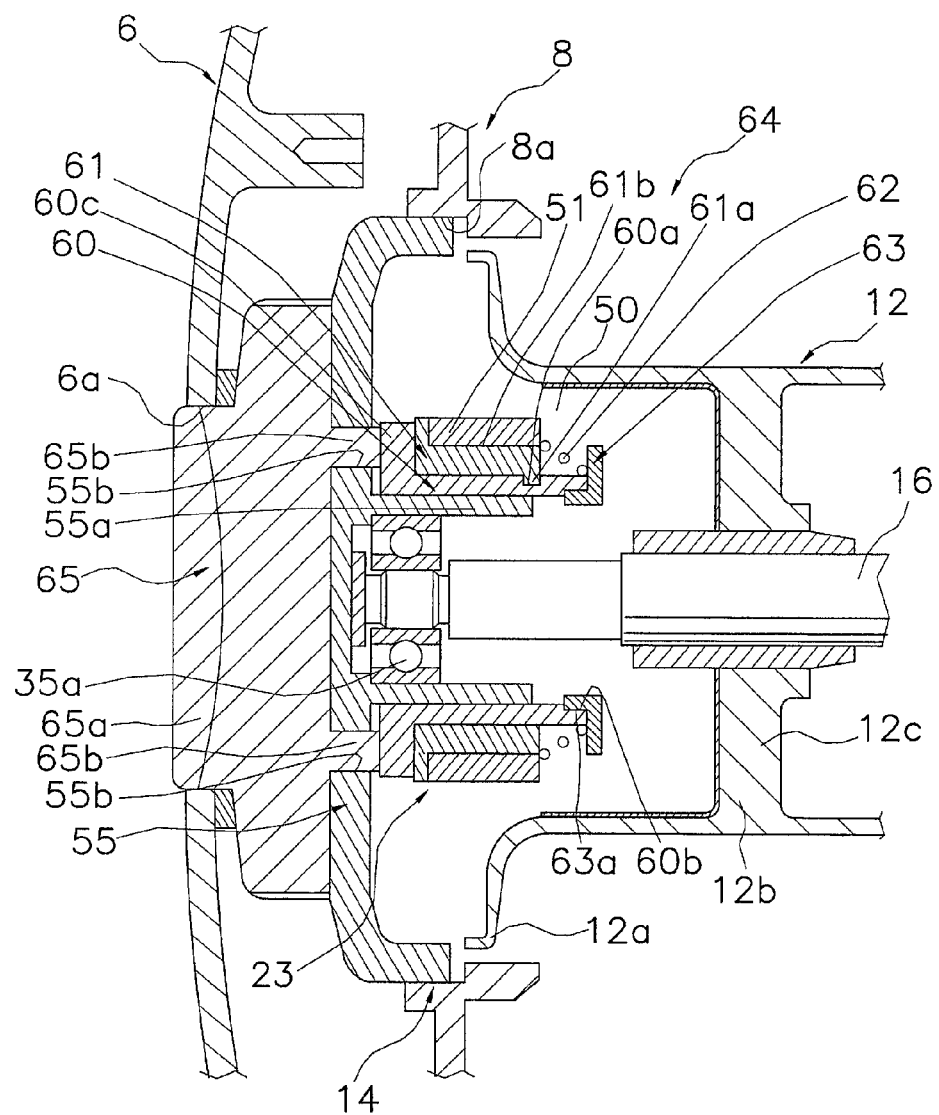
FIG. 10 is a diagram corresponding to FIG. 3 according to further yet another exemplary embodiment.

(b) The aforementioned exemplary embodiment has exemplified the case that the conductor 50 is the spool 12. Alternatively to the above, as illustrated in FIGS. 9 and 10, a metallic tubular member, which is fixed to the spool 12 and the spool shaft 16, can be set as the conductor 50.

(c) In the aforementioned exemplary embodiment, the magnets 51 are disposed on the outer periphery of the second tube 61 while being circumferentially aligned at equal intervals in eight positions. However, the number of and the intervals of the magnets 51 can be arbitrarily set.

(d) The aforementioned exemplary embodiment has exemplified the case that the initial braking force is set by moving the first tube 60 by the cam mechanism (not illustrated in the figures). Alternatively to the above, for instance, the initial braking force can be configured to be set by axially extending the female threaded portion 60b along the inner circumference of the first tube 60 and by screwing the female threaded portion 60b onto the male threaded portion formed on the outer circumference of the inner tubular portion 55a. In this case, when the operating knob 65 is turned in the clockwise direction, the first tube 60, the second tube 61 and the magnets 51 are moved in the direction closer to the spool 12 (i.e., the conductor 50). In contrast, when the operating knob 65 is turned in the counterclockwise direction, the first tube 60, the second tube 61 and the magnets 51 are moved in the direction away from the spool 12 (i.e., the conductor 50).

(e) The aforementioned exemplary embodiment has exemplified the case that a cone coil spring is used as the spring member 62 for reliably producing the sufficient axial displacement of the second tube 61. However, the spring member 62 can be a coil spring having a constant outer contour.

INDUSTRIAL APPLICABILITY

The present invention can be widely applied to spool brake devices.

Advantageous Effects of Invention

Overall, according to the present invention, in the spool brake device for the dual-bearing reel, a braking force can be regulated with a wide range and a braking force varying with spool rotation can be appropriately applied to the spool.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spool brake device for a dual-bearing reel configured to apply a braking force to a spool which is rotatably mounted to a reel unit of the dual-bearing reel, the brake device comprising:

a conductor configured to be rotated in conjunction with the spool;

a magnet configured to move along an axial direction of a spool shaft of the spool with respect to the reel unit and face the conductor in a radial direction relative to the axis of the spool shaft;

a braking force adjusting unit configured to adjust the braking force which is applied to the spool in accordance with a rotation of the spool by a magnetic force acting on the conductor when the conductor is rotated, in such a way to change magnetic fluxes acting on the conductor by changing an axially facing range between the conductor and the magnet according to the movement of the magnet along the axial direction relative to the reel unit; and a first tube including an engaged portion formed along a quadratic curve.

2. The spool brake device according to claim 1, wherein the first tube is fixed to the reel unit; and a second tube is axially movably attached to the first tube, the magnet being mounted to the second tube, the first tube having an engaged portion, the second tube having an engaging portion which is engaged with the engaged portion, and the braking force adjusting unit being configured to move the engaging portion of the second tube along the engaged portion of the first tube in order to move the magnet along the axial direction with respect to the reel unit and change the facing range.

3. The spool brake device according to claim 2, wherein the engaged portion of the first tube is formed along a curve defined by a first reference axis and a second reference axis, the first reference axis extends along the axial direction on an outer peripheral surface of the first tube, and the second reference axis circumferentially extends on the outer peripheral surface of the first tube.

4. The spool brake device according to claim 2, wherein the engaged portion is a groove formed on the outer peripheral surface of the first tube, and the engaging portion is a protrusion formed on and protruding from an inner peripheral surface of the second tube.

5. The spool brake device according to claim 1, wherein the conductor is the spool, and the spool is made of metal.

6. The spool brake device according to claim 1, wherein the conductor is a member made of metal and is fixed to the spool.

7. The spool brake device according to claim 6, wherein the conductor formed as the member made of metal is fixed to the spool shall.

8. A dual-bearing reel for being attached to a fishing rod and configured to release and wind a fishing line, the dual-bearing reel comprising:

a reel unit attached to the fishing rod;

a spool rotatably supported by the reel unit and configured to wind the fishing line onto an outer periphery thereof; and the spool brake device according to claim 1.

* * * * *